United States Patent [19]
Lagree et al.

[11] Patent Number: 5,635,772
[45] Date of Patent: Jun. 3, 1997

[54] METHOD AND APPARATUS FOR TRANSFERRING BETWEEN ELECTRICAL POWER SOURCES WHICH ADAPTIVELY BLOCKS TRANSFER UNTIL LOAD VOLTAGE DECAYS TO SAFE VALUE

[75] Inventors: James L. Lagree, Robinson Township; James R. Hanna, Brighton Township, both of Pa.; James W. McGill, Singapore, Singapore

[73] Assignee: Eaton Corporation, Cleveland, Ohio

[21] Appl. No.: 547,888

[22] Filed: Oct. 25, 1995

[51] Int. Cl.⁶ .................................................. H01H 47/00
[52] U.S. Cl. ................................. 307/64; 307/87; 307/89; 361/159
[58] Field of Search .................................. 307/43, 64, 80, 307/81, 87, 67, 89, 90; 304/492; 363/35, 36, 21; 361/2, 3, 5, 415, 159

[56] References Cited

U.S. PATENT DOCUMENTS

| | | | |
|---|---|---|---|
| 4,488,058 | 12/1984 | Cheffer | 307/66 |
| 4,490,768 | 12/1984 | Mori et al. | 361/2 |
| 4,638,175 | 1/1987 | Bradford et al. | 307/64 |
| 4,672,227 | 6/1987 | Lagree | 307/64 |
| 4,686,375 | 8/1987 | Gottfried | 290/2 |
| 4,695,738 | 9/1987 | Wilmot | 307/31 |
| 4,703,191 | 10/1987 | Ferguson | 307/64 |
| 4,879,624 | 11/1989 | Jones et al. | 361/65 |
| 5,210,685 | 5/1993 | Rosa | 363/109 |

Primary Examiner—David S. Martin
Assistant Examiner—Albert W. Paladini
Attorney, Agent, or Firm—Martin J. Moran

[57] ABSTRACT

Transfer between alternative electrical power sources for highly inductive loads, such as motors, is made using an open transition with the load connected to the new source only after the voltage on the load bus has fallen below a predetermined value, preferably a value which is about 30% or less of the nominal source voltage.

2 Claims, 2 Drawing Sheets

METHOD AND APPARATUS FOR TRANSFERRING BETWEEN ELECTRICAL POWER SOURCES WHICH ADAPTIVELY BLOCKS TRANSFER UNTIL LOAD VOLTAGE DECAYS TO SAFE VALUE

BACKGROUND OF THE INVENTION

1. Field of the Invention

This invention relates to apparatus and a method for providing electric power to a load from alternate sources, and more particularly, to a transfer switch system which prevents connection of a source to a load bus as long as a large out-of-phase voltage such as would be produced by a highly inductive load remains on the load bus.

2. Background Information

Alternate power sources are provided for any number of applications which cannot withstand a lengthy interruption in electric power. Typically, power is provided from a primary source with back-up provided by a secondary source. Often the primary source is a utility, and the secondary source is an auxiliary power source such as an engine driven generator.

Transfer switches are used to switch between the two power sources. The transfers can be made automatically or manually. In the case of a generator driven auxiliary power source, power must be stabilized before the transfer can be made. In any event, the two power sources cannot be connected to the load simultaneously unless they are in phase. Thus, most transfer switches make an open transition transfer. That is, the previously connected source is disconnected from the load before the other source is connected. However, there can still be a problem if the load is highly inductive such as a motor which can produce a residual voltage on the load bus. The frequency of this residual voltage is a function of motor speed which decreases with time, so that the phase is continuously changing relative to the phase of the new source. While the amplitude of the residual voltage decays with time, a high initial value together with the random phase relationship can produce a vector difference resulting in high inrush currents which may damage the motor or at least trip overcurrent protective decives in the system.

The most common approach to overcoming the problem of the residual voltage produced by highly inductive loads is to provide a time delay which allows the residual voltage to fall to a safe level before the second source is connected. Typically, the new source can be connected to the load when the residual voltage has dropped below about 30% of the initial value. While this is effective, it requires providing a time delay adequate to accommodate the worst case.

There is a need therefore, for an improved apparatus and method for transferring highly inductive loads from one power source to another.

There is also a need for such an apparatus and method for making such a transfer as soon as it can be safely made.

There is also a need for such an apparatus and method for making such a transfer without having to provide for synchronization of source voltage and residual voltage produced by the load.

SUMMARY OF THE INVENTION

These needs and others are satisfied by the invention which is directed to a method and apparatus for transferring a highly inductive load from one power source to another power source with an open transition by monitoring an electrical parameter on the load bus and closing in on the new source only after the value of that parameter has dropped to a predetermined percentage of a nominal value. Preferably, the electrical parameter is the load voltage, which for a motor load is the residual load voltage or back EMF of the motor. In the exemplary embodiment of the invention, the transfer to the formerly inactive source is made when the load voltage falls below about 30% of normal line voltage.

More particularly, the invention embraces a transfer switch system which includes switching means having a first closed state in which a first source is connected to the load bus and a second closed state in which the second source is connected to the load bus. One of these closed states is initially active and the other is initially inactive. A controller includes means for monitoring the voltage on the load bus, opening means for opening the switch means from the initially active state to an open or neutral state and closing means operating the switching means from the open state to the initially inactive closed state only after the load voltage falls below the predetermined value. As previously mentioned, this predetermined value of the load voltage is preferably below about 30% of the normal load voltage.

The invention also embraces the method of transferring a highly inductive load from one electric power source to another by disconnecting the load from the one electrical power source, monitoring the voltage on the highly inductive load, and connecting the highly inductive load to the other electric power source only after the voltage on the load bus has decayed to at least a predetermined value, preferably below about 30% of the nominal load voltage.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
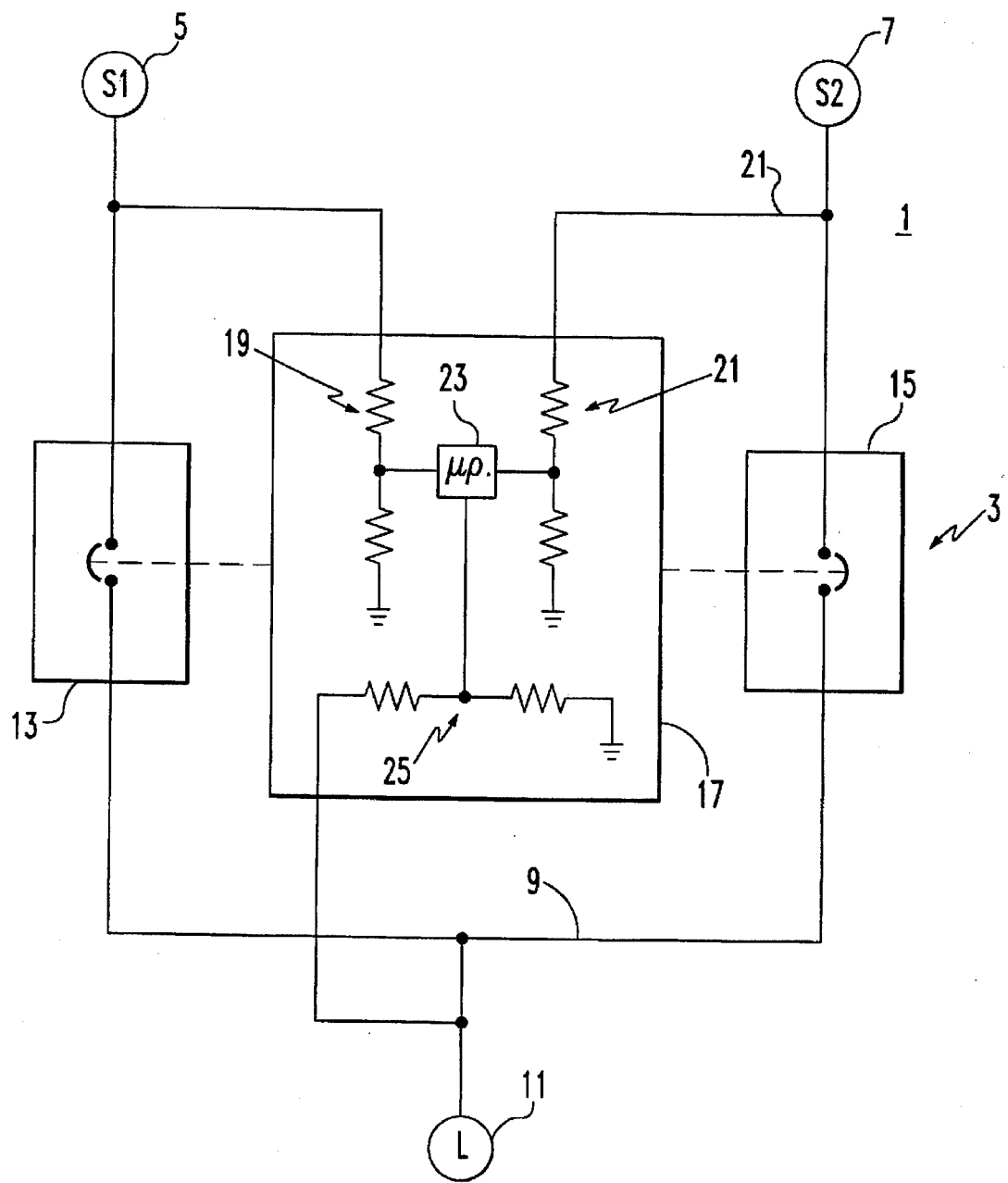
FIG. 1 is a schematic diagram of a transfer switch in accordance with the invention for supplying power to a load from a selected one of two electric sources.

FIG. 1 illustrates an electric power distribution system 1 which includes a transfer switch system 3 for selectively connecting one of two electric power sources 5 and 7 to a load bus 9 supplying power to one or more loads 11, such as electric motors or other highly inductive devices. The two electric sources 5 and 7 can, for instance, both be utilities, or one could be a utility and the other could be an auxiliary power source such as a motor driven generator or any other combination of alternate power sources. The electric distribution system is shown in single line for clarity, but may be either single phase or multiphase.

The transfer switch system 3 includes a first electrical switch 13 for connecting the source 5 to the load bus 9 and a second electrical switch 15 for selectively connecting the second source 7 to the load bus. In the preferred embodiment of the invention, these switches 13 and 15 are circuit breakers which provide overcurrent protection as well as switching between sources. Alternatively, switches without overcurrent protection or with separate overcurrent relays could be used as the switches 13 and 15. As yet another alternative, the switches 13 and 15 can be combined in a single double pole, double throw switch.

Operation of the switches 13 and 15 is controlled by a controller 17 which monitors the voltages of the sources 5 and 7 through voltage sensors in the form of voltage dividers 19 and 21 respectively. As is well known, the controller 17 selectively operates the switches 13 and 15. For instance, where the first source is a commercial power source and the second source 7 is an auxiliary power source having an engine driven generator, the controller 17 can designate the commercial power source 5 as the preferred source which will be connected to the load bus 9 as long as the monitored voltage of the commercial power source is within a prescribed range. If the commercial power source does not remain within prescribed limits, or for test purposes, or for other reasons, the commercial power source 5 can be disconnected from the load bus 9 and replaced by the auxiliary power generator 7. The controller 17 continues to monitor the first source and when it returns to normal the controller can automatically transfer back to the preferred source. These transfers between sources are made through an open transition. That is, the initially active source is disconnected from the load bus 9 before the formerly inactive source is made active by connecting it to the load bus. The controller 17 includes a microprocessor 23 which applies well known criteria to determine the availability of the two sources and to control the transfers between sources.

As mentioned above, highly inductive loads 11, such as electric motors, generate a residual voltage on the load bus after they are disconnected from an active source. This residual voltage, such as the back EMF generated by a motor, is asynchronous with respect to the voltage generated by the new source, and in the case of the motor, the frequency decreases as the motor slows down. Instead of utilizing a time delay, which must be large enough to account for the largest inductive load that may be present on the load bus, the controller of the present invention monitors the load voltage through a sensor in the form of a voltage divider 25. The controller 17 blocks transfer to the new source until the voltage on the load bus falls to less than a selected percentage of the normal load voltage when it is connected to a power source. In the exemplary system, this selected percentage can be anywhere from about 30% on down to 0%. The load voltage will be asynchronous with respect to the new source to which it is to be connected, however, when the amplitude of the back EMF is below about 30% of the source voltage the mismatch can be absorbed by the system. By monitoring the load voltage in accordance with the invention, the transfer between sources can be made as soon as the back EMF has decayed to a safe level. This is important in a system where the inductance on the load bus can vary substantially. For instance, at certain times of the day a number of motors may be connected to the load bus while at other times the inductive component of the load may be very low as where only a few or even no motors are running.

Figure 2:
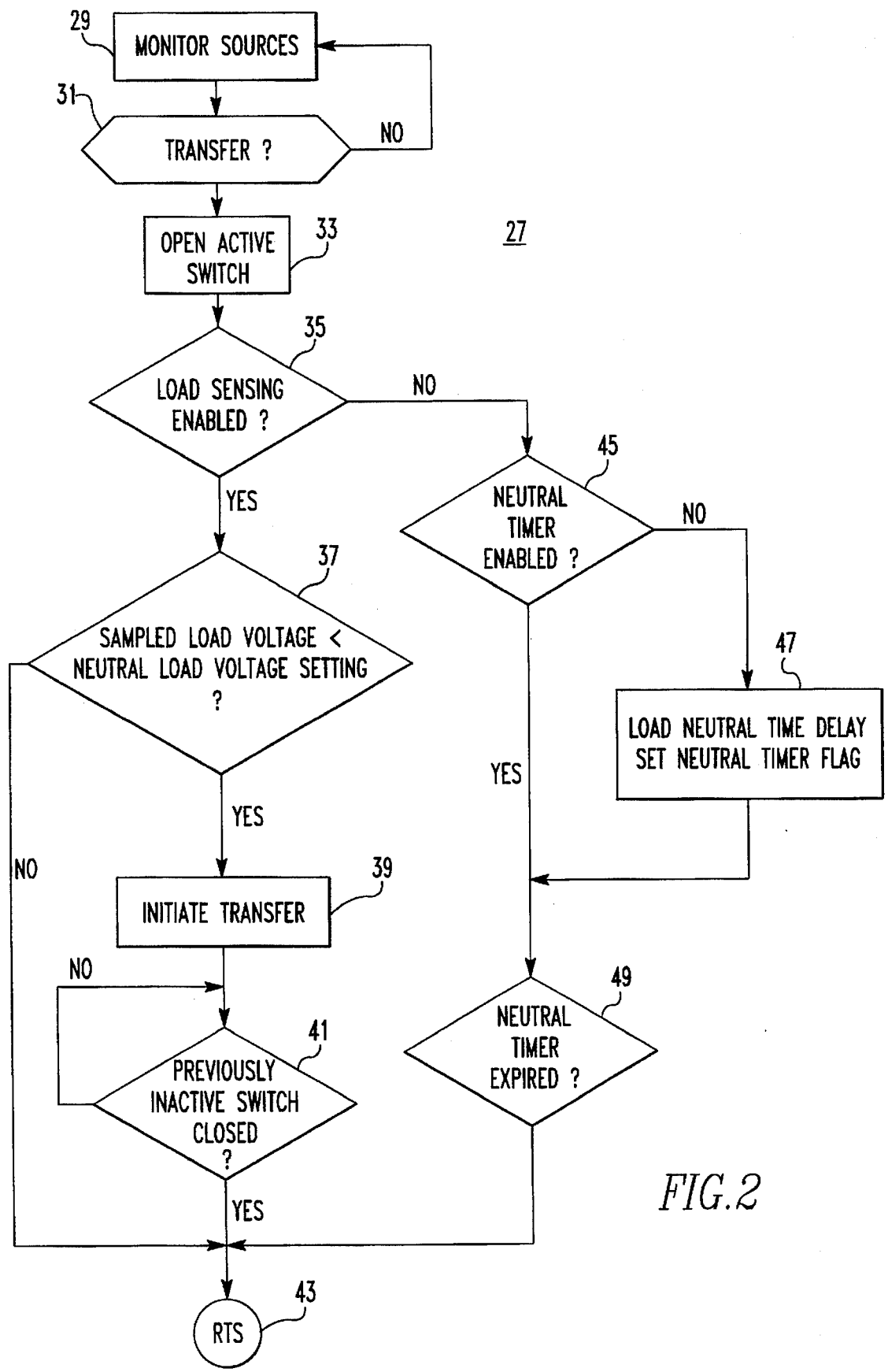
FIG. 2 is a flow chart of a computer program utilized by the transfer switch shown in FIG. 1 for making transfers between two power sources.

FIG. 2 is a flow chart for a program used by the microprocessor 23 to implement the invention. This program includes a conventional time delay as a selectable alternative to load sensing. As shown, this routine 27 monitors at 29 the sources 5 and 7 through the voltage dividers 19 and 21. If conditions indicate that a transfer should be made as determined at 31, the active one of the switches 13 and 15 is opened at 33. If load sensing is enabled at 35, the load voltage is sampled at 37 through the voltage divider 25. If the sampled load voltage is below the load voltage setting for the neutral or open state as determined at 37, then a transfer is initiated at 39. When the previously inactive switch is closed, it becomes the active switch, as determined at 41 the routine then returns to start at 43. The routine also returns to start if the sampled load voltage is not less than the selected setting as determined at 37.

If load sensing has not been enabled, as determined at 35, then the prior art time delay is used. When the timer routine is first selected at 45, a timer flag is set at 47. On subsequent runs of the routine the neutral timer is checked at 49 and when it has expired the transfer is initiated at 39.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of transferring a highly inductive load from one electric power source to another electric power source, said method comprising the steps of:

disconnecting the highly inductive load from said one electric power source;

monitoring residual voltage on said highly inductive load; and connecting the highly inductive load to said another electric power source only after said residual voltage on the highly inductive load has decayed to at least a predetermined value.

2. The method of claim 1 wherein said another power source has a nominal voltage, and said step of connecting comprises connecting said highly inductive load to said another power source only after said residual voltage on the highly inductive load has decayed to a predetermined value which is equal to or less than about 30% of said nominal voltage.

* * * * *